United States Patent [19]
Ytterberg et al.

[11] Patent Number: 5,643,509
[45] Date of Patent: Jul. 1, 1997

[54] METHOD FOR FORMING A ROLLER COMPACTED CONCRETE INDUSTRIAL FLOOR SLAB

[75] Inventors: Carl N. Ytterberg, Denver, Colo.; Ernest K. Schrader, Walla Walla, Wash.

[73] Assignee: Kalman Floor Company, Inc., Evergreen, Colo.

[21] Appl. No.: 505,884

[22] Filed: Jul. 24, 1995

Related U.S. Application Data

[63] Continuation-in-part of Ser. No. 115,090, Sep. 2, 1993, abandoned.

[51] Int. Cl.[6] ............................... E04B 1/16; B28B 1/08
[52] U.S. Cl. ........................ 264/34; 264/31; 264/69
[58] Field of Search ............................ 264/31, 34, 69

[56] References Cited

U.S. PATENT DOCUMENTS 4,981,626  1/1991  Uchizaki ........................... 264/23

OTHER PUBLICATIONS

Roller–Compacted Concrete for Dams, May 1993.

Composite Concrete Pavements with Roller–Compacted Concrete, *Transportation Research Record* 1003, 1985.

RCC Paving and Slabs—Deeper is Cheaper, *Concrete International*, May 1989.

Roller-compacted Concrete, *Portland Cement Association*, Sep. 1977.

Roller–Compacted Concrete Pavements: Design and Construction, *ASCE Files*, Nov. 1986.

*Primary Examiner*—Christopher A. Fiorilla
*Attorney, Agent, or Firm*—Watson Cole Stevens Davis, P.L.L.C.

[57] ABSTRACT

A roller compacted concrete industrial floor slab is formed by surface finishing the slab by using a separate thin topping bonded to a roughened surface of the RCC, or by manipulating the RCC surface itself by working into its surface a finish mixture of cement-coated, rice-sized grit in a moisture saturated condition to fill any voids in the surface.

4 Claims, 1 Drawing Sheet

METHOD FOR FORMING A ROLLER COMPACTED CONCRETE INDUSTRIAL FLOOR SLAB

RELATED APPLICATION

This application is a continuation-in-part of application Ser. No. 08/115,090, filed Sep. 2, 1993 now abandoned.

BACKGROUND OF THE INVENTION

This invention relates generally to a method for forming a roller compacted concrete industrial floor slab, and more particularly to such a method for forming a roller compacted concrete monolithic, untopped, industrial floor slab as well as a roller compacted concrete industrial floor slab having a thin topping.

Roller compacted concrete (RCC) is concrete, but it is placed by nontraditional methods. This requires a drier or stiffer consistency. RCC can have a much broader range of material properties than conventionally placed concrete, it can use aggregates not meeting normal requirements, it can be placed at very high production rates, and it can be much less expensive.

By definition, RCC is concrete comprising a damp mixture of cement, sand, aggregate and water, having a consistency allowing it to be compacted with a heavy vibratory roller, for example, a ten-ton roller intended for asphalt and granular base. RCC is usually mixed in a continuous process rather than in batches, delivered with trucks or conveyors, spread in layers using a bulldozer, and given final compaction with a vibratory roller.

RCC has generally been used for applications such as dam construction, pavement and bridge deck construction requiring a thick topping, usually two inches, as an essential element to achieve the required strength and fatigue life of the exterior slabs.

Heretofore, RCC has not been developed for use as an industrial floor slab adapted to withstand hard tire and steel wheeled equipment in combination with fixed rack loads for slabs on grade, versus aircraft, trucks and mixed soft tired vehicles for highways and airports with no fixed loads in pavement applications. The critical gross loads for design are very different for industrial floor slabs compared to pavement applications.

The tolerances and service requirements for pavements are different from those typically specified for the type of slab on grade work according to the present invention. Even the method of measurement for tolerance is different. Also, the placing procedures and equipment used are very different for pavements compared to slabs on grade. Typical highway pavement equipment and finishing procedures are not available to practically place, finish, or provide the industrial floor slab of the invention.

RCC pavement technology has not been considered as suitable for industrial floor slabs where a much denser, flatter and easily cleaned surface is required. Types of loads supported on a floor slab are markedly different, and the pavement or dam construction RCC does not require the surface finish needed for an industrial floor slab compared to an RCC pavement which is normally formed with a skid resistant surface. Industrial floors also require a high ride quality in all directions as compared to pavements which require a ride quality in only the direction of traffic.

Industrial floor slabs, typically subjected to uneven loading, rack loading, and concentrated postloads, require different design considerations compared to that of pavements.

Joints in pavements typically use a relatively soft filler material, the main objective of which is to exclude debris accumulation. Floor slabs normally undergo less extreme critical variations and generally use a harder filler material in order to provide for load continuity across the joint. And, in some industrial floor slab applications, such as in freezers and the like, the floor slab is subjected to relatively large temperature fluctuations, such as between minus 20° F. and plus 80° F. or higher during cleaning cycles. Although the cycles are infrequent, the stresses to which the floor slab are subjected are significant. Further, floor slabs often require highly finished surfaces to reduce porosity and minimize chemical attack, especially in locations where food and food products are prepared.

Curing methods for floor slabs are also different from paving operations, as curing may require active removal of excess water and special ventilation when the floor slab is applied to interior applications.

U.S. Pat. No. 4,981,626 to Uchizaki relates to a method for forming a dense concrete surface layer on concrete placed by traditional methods. This prior art method does not relate to roller compacted concrete, or to improvements in RCC pavements structures to which the present invention relates.

As a first step according to the Uchizaki method, concrete having a water/cement ratio of 45% is placed on the ground and subjected to vibrations with a frequency of 100 Hz and an amplitude of 3 mm applied to the concrete surface by a vibrator immediately after placement. The concrete is left to stand for four hours. If the frequency and amplitude are less than 100 Hz and 1 mm, the vibrator necessary for forming an effective mortar layer becomes too large.

During the first step, coarse aggregate particles are allowed to sink into the interior of the slab due to the vibrations imparted by the vibrator, thereby forming a mortar layer.

The standing time is such that the water/cement ratio of the mortar surface becomes 15 to 20 percent, beyond which a dense layer ceases to be formed.

As a second step, an ultrasonic vibrator with a frequency of 19.5 kHz and an amplitude of 5 µ is applied to the mortar surface with a pressure of 0.05 kg/cm$^2$, the ultrasonic vibrator being moved at a given velocity so as to scrape off the surface of the mortar layer. By scraping off the mortar surface during this second step using the ultrasonic vibrator, large surface irregularities are said to be removed and a smooth surface is said to be formed. A water-shielding layer forming a dense layer is said to be formed to prevent water from moving up from the interior of the concrete below the water-shielding layer to the surface at the time when the third and fourth steps are performed.

As a third step, a mortar layer is spread onto the surface of the scraped concrete and is fluidized by a high vibrating pressure.

As a fourth step, an ultrasonic vibrator is applied to the water-shielding layer of the mortar layer at a given pressure and is moved at a given velocity to allow the mortar layers to be integrated together to achieve a very dense layer having a thickness of 1 cm or thereabouts.

The surface finish achieved during the formation of a roller compacted concrete floor slab according to the invention is wholly unlike that of the dense concrete surface layer formed by Uchizaki on conventionally placed concrete.

SUMMARY OF THE INVENTION

It is an object of the present invention to improve upon the roller compacted concrete pavement construction to adapt the same for application as an RCC floor slab having a much denser, flatter and more easily cleaned surface finish. The RCC floor slab produced according to the invention is either an untopped, monolithic floor slab having a dense and smooth surface finish, or an RCC floor slab having a thin topping which includes an aggregate and which is finished into a smooth surface.

According to the present invention, two methods are utilized for changing the poor surface finish of the known roller compacted concrete pavement structure to one suitable for industrial concrete floors by the use of either a separate thin concrete topping bonded to the surface of the RCC, or by the manipulation of the RCC surface itself so as to produce a hardened, dense monolithic surface.

In accordance with one method of the invention for forming a roller compacted concrete monolithic industrial floor slab, a no-slump concrete is produced having a saturated surface-dry condition comprising a mixture of aggregate, cementitious material and water, the no-slump concrete being placed on the ground to form a concrete slab of predetermined thickness. A vibratory single or double drum compactor may be used to apply rolling and vibratory forces to the upper surface of the slab in the range of 10 to 50 Hz, typically 20 to 25 Hz, to compact the slab to substantially its maximum practically achievable density while allowing the aggregate to remain displaced throughout the slab between its upper and bottom surfaces without sinking into the interior of the slab.

The upper surface of the slab is finished into a hardened, dense monolithic surface prior to curing by applying a finish surface mixture of cement-coated rice-sized grit in a moisture saturated condition, and applying vibratory forces to the surface finish mixture at a frequency of 100 to 200 Hz and an amplitude of 3 to 5 mm to work this surface finish mixture into any voids in the upper surface of the RCC slab, thereby using the very stony surface of the RCC by filling in the voids between the stones with the rice-sized tough basalt aggregate. After vibration, the finished slab surface may be trowelled to effect a smooth, dense, burnished surface finish.

According to the other method of the invention, after the no-slump RCC is produced, placed on the ground and roller compacted as before, the upper surface of the slab is roughened in preparation for a concrete topping. A concrete topping layer, ½ to ¾ inch thick, is applied to the roughened upper surface, the topping comprising a mixture of washed concrete sand, aggregate, cementitious material and water. Vibratory forces are applied to the upper surface of the topping layer at a frequency of 100 to 200 Hz and an amplitude of 3 to 5 mm to effect and smooth and dense finish. The upper surface of the topping layer may be dewatered prior to applying the vibratory forces, and the dewatering step may be carried out via use of a layer of burlap covered with dry cement. After vibrating the upper surface of the topping layer may be troweled to enhance formation of a smooth surface.

Concrete floor toppings such as dewatered concrete, non-dewatered concrete, silica fume concrete, iron aggregate concrete, fiber reinforced concrete, or latex modified concrete, which are each mixtures of particular ingredients, may be utilized as concrete floor toppings.

DETAILED DESCRIPTION OF THE INVENTION

Figure 1:
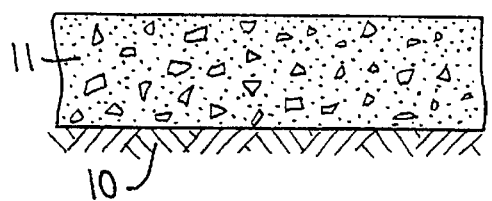
FIGS. 1 to 3 are step diagrams in section, each illustrating the procedures of forming a roller compacted concrete monolithic industrial floor slab according to one method of the invention.
Figure 2:
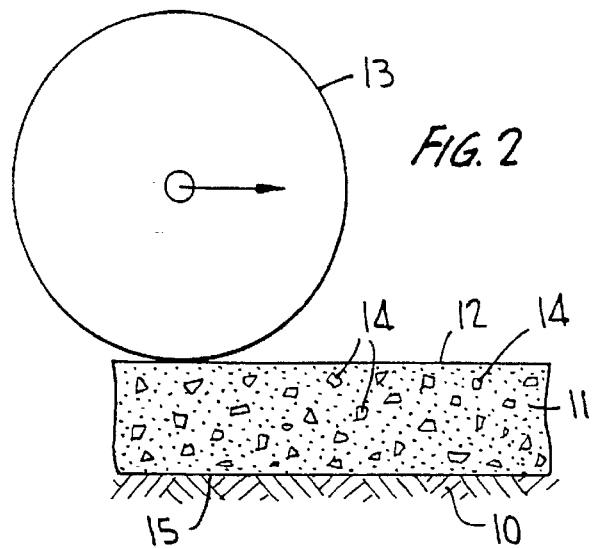

Turning now to the drawings wherein like reference characters refer to like and corresponding parts throughout the several views, a method according to the invention for forming a roller compacted concrete monolithic industrial floor slab will be described with reference to FIGS. 1 to 3.

In particular, a no-slump concrete having a saturated, surface-dry condition is first produced. The term "no-slump" is a condition of the RCC having no apparent workability and having an apparent dryness meeting the criteria of the ASTM Slump Test No. C143. The term "saturated surface-dry" (SSD) is defined by the American Concrete Institute as the condition of an aggregate particle or other porous solid when the permeable voids are filled with water and no water is on the exposed surfaces.

The concrete may comprise a mixture of aggregate having a Nominal Maximum Size Aggregate (NMSA) in a range from ¼ inch to 1.0 inch. The term "Nominal Maximum Size Aggregate" is defined by the American Concrete Institute in specifications for and in descriptions of aggregate as the smallest sieve opening through which the entire amount of the aggregate is permitted to pass.

The no-slump concrete mixture further comprises 150 to 700 pounds per cubic yard of cementitious material, and 150 to 700 pounds per cubic yard of water such that the mixture allows for compaction.

The aggregate may comprise a gravel or processed rock and sand mixture and may comprise materials suitable for conventional concrete. The concrete mixture may contain impurities which are normally unacceptable. And, with some mixtures, it is unnecessary to wash the aggregate which can contain up to about 11% of non-plastic fines.

The concrete mixture is combined with a suitable amount of water to give it the consistency of damp sand or gravel. In particular, the concrete mixture is damped sufficiently to enable it to be compacted by a vibratory compacting roller or other external compacting device while being capable in the moistened state to support such devices. In the preferred embodiment, the concrete mixture contains the least amount of water that results in a well-compacted mix without internal vibration. In general, the concrete mixture is expected to be slightly above an SSD condition when deposited on the ground.

In the preferred embodiment, the concrete mixture contains 250 to 400 pounds of cementitious material for cubic yard and 350 pounds of water per cubic yard of mixture for a topped slab to be described in more detail hereinafter. For an untopped, monolithic slab, the mixture contains about 350 to 650 pounds of cementitious material per cubic yard and 250 to 300 pounds of water per cubic yard. For both the topped and the monolithic floor slabs produced according to the invention, the ratio of water to cementitious material is about 35 percent to 100 percent.

In addition to the aforedescribed ingredients, the no-slump concrete mixture may include additives such as water reducers or retarders, accelerators, coloring agents, air entraining agents and hardening agents.

The no-slump concrete mixture is placed on the ground 10 to form a concrete slab 11 (FIG. 1) of predetermined thickness. Upper surface 12 of the concrete slab is roller compacted as shown in FIG. 2 using a vibratory single or double drum compactor schematically illustrated by drum 13 which moves in the direction of the arrow. Compacting is carried out prior to curing by applying rolling and vibratory forces to upper surface 12 employing known device 13 using the weight of the device without applying an added external force. The vibration is carried out using low frequency equipment common in the construction industry, typically operated at 20 to 25 Hz with a typical frequency range of 10 to 50 Hz. The consistency of the mixture and the vibration frequency are chosen to avoid the formation of a top mortar layer of the mixture such that the aggregate particles 14 do not sink below the upper surface of the mixture to the interior of the slab but rather remain dispersed throughout the slab from the upper surface to bottom surface 15 thereof.

According to one method of the invention, upper surface 12 of the concrete slab is finished into a hardened, dense monolithic surface, the finishing process being performed before or after the RCC has reached its chemical initial or final set prior to curing.

Figure 3:
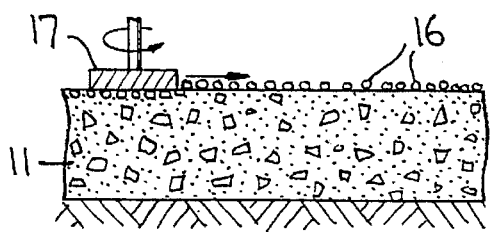
Figure 4:
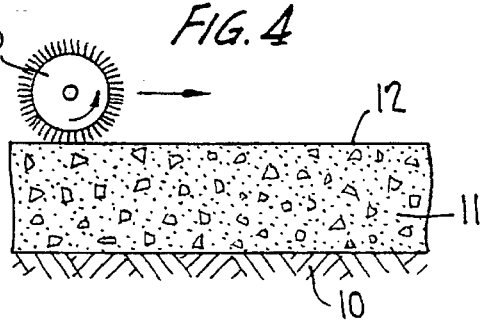
FIGS. 4 to 8 are views similar to FIGS. 1 to 3, each showing the procedures, in addition to those shown in FIGS. 1 and 2, of forming a roller compacted concrete topped floor slab according to the invention.

The finishing step includes applying to upper surface 12 of the concrete slab a finish surface mixture 16 shown in FIG. 3 to effect a dense monolithic stone surface. The monolithic finish does not involve the use of ultrasonic vibration or the scraping off of any fine layer of cement/sand mortar at the surface, as in the prior art, given that there is no such mortar surface to scrape off the RCC surface.

Because the RCC surface 12 is essentially dry, i.e., having a saturated surface-dry condition, water is added to the surface contained in the finish surface mixture 16 which includes a cementitious material coated rice-sized tough basalt aggregate or trap rock grit in a moisture saturated condition applied in an amount of about 0.2 to 0.4 pounds per square foot of upper surface 12. The grit has a size in the range of No. 4 sieve size to No. 50 sieve size, U.S. Sieve Series, and the cementitious material comprises 8 to 15 percent by weight of the grit.

The finishing process further includes the application of vibratory forces the surface finish mixture 16 at a frequency of 100 to 200 Hz and an amplitude of 3 to 5 mm to work the surface finish mixture into any voids in upper surface 12 of the slab, as illustrated in FIG. 3. For this purpose, a vibratory device 17 is utilized, which may be of the type disclosed in any one of U.S. Pat. Nos. 2,999,432, 3,046,855, 3,066,584 and 3,066,583. And, commercially available vibratory float equipment can be used for carrying out this vibratory step of the finishing process. Thus, by manipulating the RCC surface itself, a hardened, dense monolithic surface is produced. A very stony monolithic surface is produced according to the invention with a low water/cement ratio rather than achieving a sand/cement mortar surface as in the prior art. And, upper surface 12 may then be trowelled to enhance the formation of a smooth, dense, burnished surface finish.

Returning to FIG. 1, it should be pointed out that the RCC mixture is deposited on the ground and spread by hand or using relatively small power equipment. The no-slump concrete is leveled to a controlled lift height, such as 4 to 8 inches, whereafter it is compacted using vibratory roller 13 (typically operated at a frequency of 20 to 25 Hz, with a typical frequency range of 10 to 50 Hz) or other external compaction equipment of similar frequency and of sufficient size and weight to apply a force sufficient to compact the no-slump concrete to within several percent of its maximum practically achievable density, e.g., about an average of 94 percent of the air free density. For example, a dynamic force in the range of about 200 to 300 pounds per inch of drum width is sufficient to produce a monolithic slab structure when deposited in lifts or thicknesses of about 4 to 6 inches per layer. Additional layers or lifts of uncompacted, no-slump concrete may be deposited atop the compacted material before carrying out the finishing process and compacted to form a monolithic slab with no discernable layers or lines of delamination. The subsequent layers are deposited onto the compacted layer or layers in controlled lift heights of 4 to 6 inches and the layers are compacted within a period of time prior to total setting or rehardening of the sublayers, typically between 6 and 8 hours.

It is possible to affect cure of the RCC slab 11 in the presence of carbon monoxide or carbon dioxide. The ingredients for the RCC slab are not as adversely affected by the presence of carbon dioxide in the atmosphere during the finishing or compacting steps as with conventionally placed slumpable concrete.

To provide for expansion and contraction of the RCC slab which is surface finished as aforedescribed, expansion joints may be formed therein by cutting the slab using conventional concrete cutting apparatus. The cutting provides a joint or discontinuity in the surface of the slab of about ⅛ to ¼ inches wide and about ⅝ to 2½ inches deep. A relatively hard joint filling material is deposited in the joint to allow for expansion and contraction of the joint. The material may be selected from a variety of known materials to be sufficiently resilient to expand and contract with the expected expansion and contraction of the slab, to prevent deposition of debris in the slab joint and also to provide a relatively continuous surface in the joints to permit loads to bridge the same.

The exemplary formulations disclosed herein for the no-slump concrete produce a floor slab having a relatively small resulting curl or deformation at the joints. Preferably, the resulting curl is less than about ⅛ of an inch, so that when used indoors with rubber-wheeled or steel-wheeled vehicles, there is little or no chipping at the joint surfaces of the floor slab.

According to another method of the invention for forming a roller compacted concrete topped floor slab, no-slump concrete having a saturated surface-dry condition with the aforedescribed formulation is placed on the ground to form a concrete slab, as described with reference to FIGS. 1 and 2.

In accordance with this further method, upper surface 12 of slab 11 is roughened in order to remove loose material and achieve a roughened surface to which the topping layer is to be bonded. The roughening may be carried out using a wire broom drum 18 or the like, pressurized jets of air, or some other suitable means.

A topping layer 19 having a thickness of ½ to ¾ inch is then applied to roughened upper surface 12, the topping comprising materials of concrete floor topping ingredients such as dewatered concrete, non-dewatered concrete, silica fume concrete, iron aggregate concrete, fiber reinforced concrete or latex modified concrete.

Examples of the foregoing are listed in the Table below:

CONCRETE FLOOR TOPPINGS
(In pounds Per Cubic Yard of Topping)

| Dewatered Concrete | 800–1200 washed concrete sand |
| | 1800–2200 CA* (No. 4⅜" sieve size) |

CONCRETE FLOOR TOPPINGS
(In pounds Per Cubic Yard of Topping)

| | |
|---|---|
| Non-Dewatered Concrete | 600–850 cementitious |
| | 200–350 water before dewatering |
| | 1200–1500 washed concrete sand |
| | 1500–1800 CA* (No. 4⅜" sieve size) |
| Silica Fume Concrete | 600–800 cementitious |
| | 200–300 water |
| | water reducer @ 2–10 oz/cwt cement |
| | high range WR 10–20 oz/cwt cement |
| | 700–1100 washed concrete sand |
| | 1800–2200 CA* (No. 4⅜" sieve size) |
| | 500–750 cementitious |
| | 90–125 silica fume |
| | 150–340 water |
| | water reducer @ 2–10 oz/cwt cement |
| | or |
| | high range WR @ 2–10 oz/cwt cement |
| Iron Aggregate Concrete | 1000–1400 washed concrete sand |
| | 3000–3500 ¼ inch NMSA** iron aggregate |
| | 600–850 cementitious |
| | 180–350 lbs water |
| | water reducer 2–10 oz/cwt cement |
| | or |
| | high range WR 10–20 oz/cwt cement |
| Fiber Reinforced Concrete | 800–1200 washed concrete sand |
| | 1750–2150 CA* (No. 4⅜" sieve size) |
| | 30–60 * ⅜–1½ inch long steel |
| | 500–750 cementitious |
| | 150–340 water |
| | water reducer 2–10 oz/cwt cement |
| Latex Modified Concrete | 500–800 washed concrete sand |
| | 2200–2500 ¹⁄₁₀ inch NMSA** CA* |
| | 500–750 cementitious |
| | 50–165 polymer |
| | 100–350 water |

*CA — Coarse Aggregate
**NMSA — Nominal Maximum Size Aggregate

The cementitious material may include a variety of materials, such as pozzolan, slag fly ash and/or Portland cement.

Figure 5:
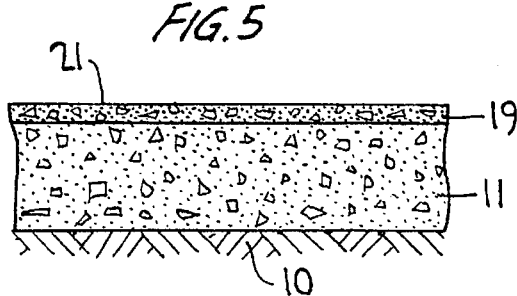

After topping layer 19 is applied to roughened surface 12 of concrete slab 11 as illustrated in FIG. 5, the topping is then straightened, or screeded, to a finish grade.

Figure 6:
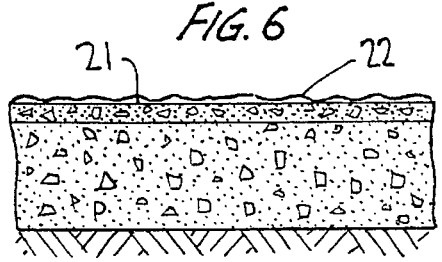

Upper surface 21 of the topping layer may be dewatered to achieve both a low water-cement ratio and a stony surface. Such dewatering may be carried out by applying to upper surface 21 a layer of burlap 22 (FIG. 6) covered with dry cement for blotting or soaking up the excess moisture from surface 21. The burlap and cement layer are removed when the topping can be walked on without indentation.

Figure 7:
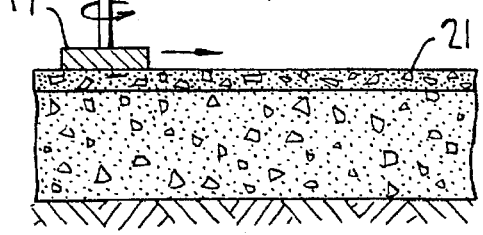

After the burlap layer is removed, vibratory forces are applied to upper surface 21 of the topping layer (FIG. 7) at a frequency of 100 to 200 Hz and an amplitude of 3 to 5 mm to effect a smooth and dense finish. The vibratory forces may be applied using a known device 17 of the same commercially available type described with reference to FIG. 3.

Figure 8:
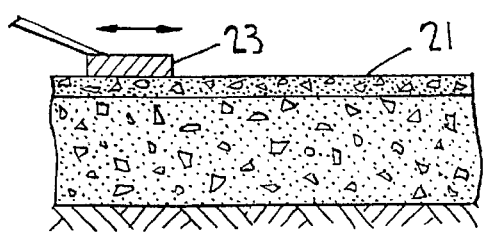

The surface layer 21 of the topping may be troweled to enhance the formation of a smooth surface. Trowelling may be carried out by hand or by a machine using a trowelling device 23 (FIG. 8) typically moved along the upper surface in directions shown by the double arrow.

The topping layer, when used as described above, is for additional wear resistance and flatness. It is not, for example, required, specified or used in pavements.

From the foregoing, it can be seen that RCC concrete structures have been adapted by the invention for use as industrial floor slabs where a much denser, flatter and easily cleaned surface finish is required. The two methods according to the invention improve upon the RCC's poor surface finish to one suitable for industrial concrete floors. In accordance with one of the surface finishing procedures, a thin concrete topping of ½ to ¾ inch thickness is bonded to the upper surface of the RCC. In accordance with the other method of the invention, the RCC surface itself is manipulated so as to produce a hardened, dense monolithic surface.

Obviously, many other modifications and variations of the present invention are made possible in the light of the above teachings. It is therefore to be understood that within the scope of the appended claims the invention may be practiced otherwise than as specifically described.

What is claimed is:

1. A method for forming a roller compacted concrete monolithic industrial floor slab, comprising the steps of:

producing a no-slump concrete having a saturated surface-dry condition using a mixture of:
        aggregate having a nominal maximum size aggregate in a range from ¼ inch to 1.0 inch;
        150 to 700 pounds per cubic yard of cementitious material; and
        150–700 pounds per cubic yard of water;

placing the no-slump concrete on the ground to form a concrete slab having a predetermined thickness;

roller compacting an upper surface of the slab prior to curing by applying rolling and vibratory forces to the surface at a frequency in the range of 10 to 50 Hz to compact the slab to substantially its maximum practically achievable density;

allowing the aggregate to remain dispersed throughout the slab from the upper surface to the bottom surface thereof without sinking into the interior of the slab; and finishing the upper surface into a hardened, dense monolithic surface prior to curing by:

applying to the upper surface an amount of finish surface mixture of about 0.2 to 0.4 pounds per square foot of the upper surface, the finish surface mixture comprising a cementitious material coated trap rock grit in a moisture saturated condition, the grit having a size in the range of No. 4 sieve size to No. 50 sieve size, U.S. Sieve Series, and the cementitious material comprising 8 to 15 percent by weight of the grit; and applying vibratory forces to the surface finish mixture at a frequency of 100 to 200 Hz and an amplitude of 3 to 5 mm to work the surface finish mixture into any voids in said upper surface.

2. The method according to claim 1, comprising the further step of trowelling the upper surface, after applying the vibratory forces, to produce a dense, burnished finished surface.

3. The method according to claim 1, wherein the roller compacting step is carried out utilizing a roller drum applying a dynamic force in a range between 200 and 300 pounds per inch of drum width.

4. The method according to claim 1, wherein the water/cement ratio of the concrete mixture is in a range of 35 to 100 percent.

* * * * *